US007326872B2

(12) United States Patent
Shannon

(10) Patent No.: US 7,326,872 B2
(45) Date of Patent: Feb. 5, 2008

(54) MULTI-FREQUENCY DYNAMIC DUMMY LOAD AND METHOD FOR TESTING PLASMA REACTOR MULTI-FREQUENCY IMPEDANCE MATCH NETWORKS

(75) Inventor: Steven C. Shannon, San Mateo, CA (US)

(73) Assignee: Applied Materials, Inc., Santa Clara, CA (US)

( * ) Notice: Subject to any disclaimer, the term of this patent is extended or adjusted under 35 U.S.C. 154(b) by 173 days.

(21) Appl. No.: 10/927,382

(22) Filed: Aug. 26, 2004

(65) Prior Publication Data

US 2005/0270118 A1 Dec. 8, 2005

Related U.S. Application Data

(60) Provisional application No. 60/566,306, filed on Apr. 28, 2004.

(51) Int. Cl.
*B23K 10/00* (2006.01)

(52) U.S. Cl. ........................... 219/121.41; 219/121.43; 118/723 I; 156/345.47

(58) Field of Classification Search ........... 219/121.54, 219/121.57, 121.43, 121.4, 121.41; 118/723 I; 204/298.21, 298.47; 156/345.44, 345.48, 156/345.47, 345.38
See application file for complete search history.

(56) References Cited

U.S. PATENT DOCUMENTS

| | | | |
|---|---|---|---|
| 3,969,666 A | 7/1976 | Simon | |
| 4,009,456 A | 2/1977 | Hopfer | |
| 4,711,983 A | 12/1987 | Gerling | |
| 5,187,454 A | 2/1993 | Collins et al. | |
| 5,321,364 A | 6/1994 | Nukiyama et al. | |
| 5,521,560 A | 5/1996 | Burns et al. | |
| 5,574,410 A | 11/1996 | Collins et al. | |
| 5,629,653 A | 5/1997 | Stimson | |
| 5,654,679 A | 8/1997 | Mavretic et al. | |
| 5,793,162 A | 8/1998 | Barnes et al. | |
| 6,066,992 A | 5/2000 | Sadaka et al. | |
| 6,331,815 B1 | 12/2001 | Oshima et al. | |
| 6,359,250 B1 | 3/2002 | Blonigan et al. | |
| 6,424,099 B1 * | 7/2002 | Kirkpatrick et al. | 315/248 |
| 6,469,488 B1 | 10/2002 | Hopkins et al. | |
| 6,522,121 B2 | 2/2003 | Coumou | |
| 6,590,179 B2 * | 7/2003 | Tanaka et al. | 219/121.43 |
| 6,674,293 B1 | 1/2004 | Tsironis | |
| 6,700,458 B2 * | 3/2004 | Mitrovic et al. | 333/34 |

(Continued)

*Primary Examiner*—Mark Paschall
(74) *Attorney, Agent, or Firm*—Christopher R. Balzan

(57) ABSTRACT

In one implementation, a method is provided for testing a plasma reactor multi-frequency matching network comprised of multiple matching networks, each of the multiple matching networks having an associated RF power source and being tunable within a tunespace. The method includes providing a multi-frequency dynamic dummy load having a frequency response within the tunespace of each of the multiple matching networks at an operating frequency of its associated RF power source. The method further includes characterizing a performance of the multi-frequency matching network based on a response of the multi-frequency matching network while simultaneously operating at multiple frequencies. In one embodiment, a plasma reactor multi-frequency dynamic dummy load is provided that is adapted for a multi-frequency matching network having multiple matching networks. Each of the multiple matching networks being tunable within a tunespace. The plasma reactor dynamic dummy load being capable of simultaneously providing a frequency response within the tunespace of each of the multiple matching networks at the operating frequency of its associated RF power source.

20 Claims, 3 Drawing Sheets

U.S. PATENT DOCUMENTS

| | | | | |
|---|---|---|---|---|
| 2003/0029567 | A1 | 2/2003 | Dhindsa et al. | |
| 2004/0025791 | A1 | 2/2004 | Chen et al. | |
| 2004/0210407 | A1 * | 10/2004 | Quon et al. | 702/65 |
| 2004/0222184 | A1 * | 11/2004 | Hayami et al. | 216/16 |

* cited by examiner

MULTI-FREQUENCY DYNAMIC DUMMY LOAD AND METHOD FOR TESTING PLASMA REACTOR MULTI-FREQUENCY IMPEDANCE MATCH NETWORKS

CROSS REFERENCE TO RELATED APPLICATION

This application claims the benefit of U.S. Provisional Application No. 60/566,306, filed on Apr. 28, 2004, by Steven C. Shannon, entitled MULTI-FREQUENCY DYNAMIC DUMMY LOAD AND METHOD FOR TESTING PLASMA REACTOR MULTI-FREQUENCY IMPEDANCE MATCH NETWORKS, herein incorporated by reference in its entirety.

BACKGROUND

In plasma reactors, an RF power supply provides plasma source power to the plasma chamber via an impedance matching network. The impedance of a plasma is a complex and highly variable function of many process parameters and conditions. The impedance match network maximizes power transfer from the RF source to the plasma. This is accomplished when the input impedance of the load is equal to the complex conjugate of the output impedance of the source or generator.

Accurate characterization of an impedance match network is critically important for providing a reliable, efficient, and predictable processes. Typically, characterization of an impedance match network is performed with a dummy load coupled to the output of the impedance match network in place of the plasma chamber.

Multiple frequency source power is sometimes utilized in plasma reactors. This includes multiple RF power supplies each having an associated frequency dependent matching network. The frequency dependent matching networks are connected to the plasma chamber at a common output. Band pass filters may be included between each frequency dependent matching network and the chamber to provide isolation for the different frequency power sources.

FIG. 1 shows simplified schematic of a dual frequency source power embodiment 100. A first power supply 110 is coupled to a first frequency dependent matching network 130. A second power supply 120 is coupled to a second frequency dependent matching network 140. The outputs of the frequency dependent matching networks are coupled together at a common point 150 to provide dual frequency source power across a load 160. In operation the load 160 represents the plasma chamber (not shown). FIG. 1 is illustrated with a dual frequency source 100 for simplicity. Multi-frequency source power may include two or more source power supplies and frequency dependent matching networks.

Characterization of the frequency dependent matching networks 130 and 140 is performed by inserting and removing separate dummy loads at 160, each dummy load designed to match the plasma chamber impedance at each operating frequency $f_1$ and $f_2$, respectively. Testing of each of the frequency dependent match networks 130 or 140 is performed separately at its associated source power frequency $f_1$ or $f_2$. Thus, the frequency dependent matching network 130 is characterized while operating at its associated source power supply 110 at its operating frequency $f_1$. The frequency dependent matching network 140 is characterized while operating at its associated source power supply 120 frequency $f_2$. Additional frequency dependent matching networks (not shown) may be similarly tested, with each frequency dependent matching network being separately tested with a separate dummy load corresponding to the particular frequency of the source power in operation for the test.

SUMMARY

In one implementation, a method is provided for testing a plasma reactor multi-frequency matching network comprised of multiple matching networks, each of the multiple matching networks being coupled to an associated RF power source and being tunable within a tunespace. The method includes providing a multi-frequency dynamic dummy load having a frequency response within the tunespace of each of the multiple matching networks at an operating frequency of its associated RF power source. The method further includes characterizing a performance of the multi-frequency matching network based on a response of the multi-frequency matching network while simultaneously operating at multiple frequencies.

In one embodiment, a plasma reactor multi-frequency dynamic dummy load is provided that is adapted for a multi-frequency matching network having multiple matching networks. Each of the multiple matching networks being tunable within a tunespace. The plasma reactor dynamic dummy load being capable of simultaneously providing a frequency response within the tunespace of each of the multiple matching networks at the operating frequency of its associated RF power source.

DESCRIPTION

Often matching networks are built for use in many different plasma reactor embodiments. Thus, the matching networks are configured for multiple chambers, each having its own range of impedances. The impedance of each reactor is influenced by the chamber configuration, the power delivery mechanism to the plasma, and the frequency dependance of load impedance of the plasma across its process window/windows. Each frequency dependent matching network has a tune space at the operating frequency/frequency range of the source power.

Typically, the tune space of the frequency dependent matching networks are chosen to provide a broad tune space, applicable to different plasma reactor configurations at the particular frequency of its corresponding source power supply. For example, as illustrated in the Smith chart of FIG. 2, one frequency dependent matching network may have a tunespace 210 associated with a high frequency power supply, while another frequency dependent matching network may have a tunespace 220 associated with a low frequency power supply. Thus, in some plasma reactors with multiple source powers of different frequencies, the tunespaces 210 and 220 of the frequency dependent matching networks do not overlap.

Figure 1:
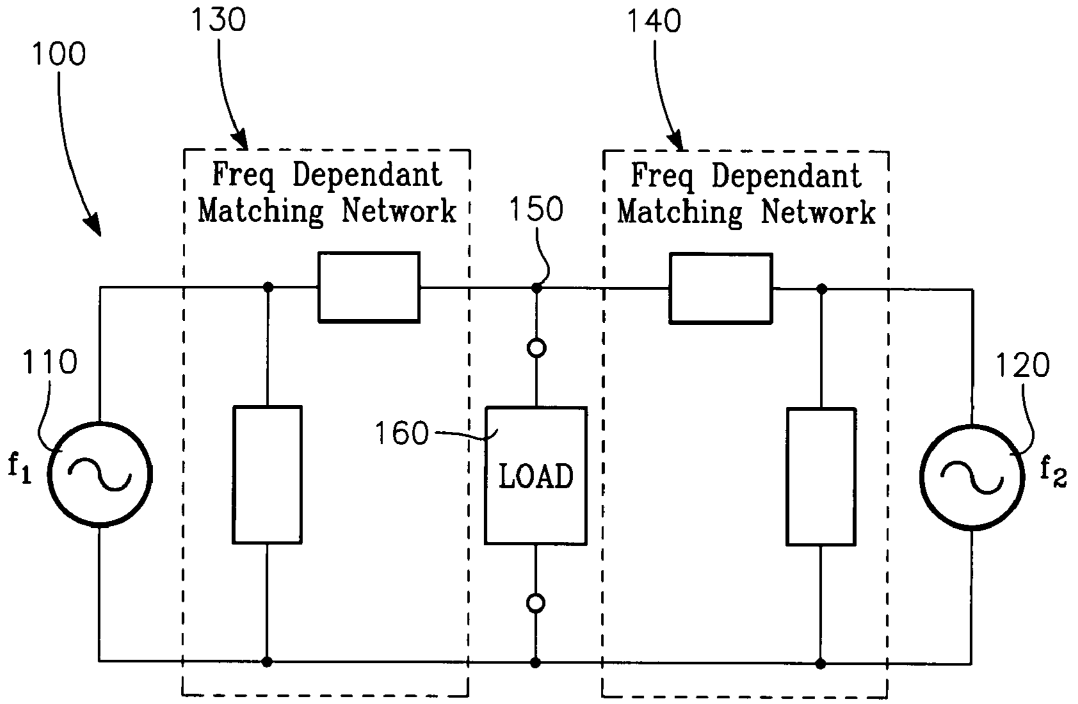
(PRIOR ART) FIG. 1
FIG. 1 illustrates a dual frequency source power with a dual frequency impedance matching network.

As a result, as discussed above with reference to FIG. 1, in conventional testing, separate dummy loads (not shown) are provided to test of each frequency dependent matching network 130 and 140. Each separate dummy load has a frequency response within a tune space at a single frequency $f_1$ or $f_2$, corresponding to the frequency of the source power 110 or 120. Characterization of a multi-frequency matching network in this way is segmented and does not accurately characterize the system.

Characterization of a match network includes several aspects. One aspect is failure testing, performed at high voltage and high current. Another aspect is determining the efficiency of the system. Yet another is calibration of the matching network voltage and current probe or VI probe.

The VI probe is located at the output of the impedance matching network. The VI probe may be used to measure the voltage and current to the plasma reactor. In some situations, the VI probe also may be used to measure phase accuracy. If the power efficiency is known, however, the phase can be calculated from $P=VI\cos\theta$.

Accuracy in VI probe calibration is essential for precise electrostatic chuck control, process control, etc. Any inaccuracy in the calibration of the VI probe will diminish process performance. The calibration of the probe is utilized to determine what coefficients should be applied to the probe measurements to provide a correct reading.

It has been observed by the present inventor, that in some situations, the frequencies of the multiple source powers are such that the side band frequencies generated within the source power delivery system of one source power supply is at, close to, or within, the frequency or frequency range of another. For example, a 2 Mhz source power can generate a sideband at 12.22, which is near the operating range of 12.88 Mhz-14.3 Mhz for a 13.56 Mhz source power. As such, testing the frequency dependent matching network while operating only its corresponding power supply may not provide an accurate characterization. For example, a frequency dependent matching network may pass a failure mode test (high voltage and current) with only a singe frequency source power in operation, but fail when the system operates with additional source powers. In addition, intermodulation effects on VI probe calibration are not examined when operating only one source power during testing.

Although band pass filtering may be used to isolate the frequency dependent matching networks, it is not practical for eliminating all the harmonic and/or intermodulation effects of multiple source power supplies at the frequency dependent matching networks. In some instances the harmonic and/or intermodulation effects may have components that come close to, or that overlap with the operating frequency of other power sources. Thus, filters may not provide a practical solution. With respect to the above example, providing a filter with a roll off response capable of blocking 12.22 Mhz, while allowing 12.88 Mhz-14.3 Mhz, is not easily achieved. If there are significant variances in these frequencies, there could be some overlapping frequencies. Furthermore, filtering becomes a less practical solution as the number of different source powers and different frequencies increases. Thus, in multi-frequency matching networks with common output to the chamber, there is some bleed off of the frequency dependent matching networks into each other.

In such situations, the characterization of the frequency dependent matching networks is not precise if each frequency dependent network is separately tested at its operating frequency. Therefore, better characterization is achieved if the multi-frequency matching network is tested with all operating frequencies simultaneously active.

Figure 3:
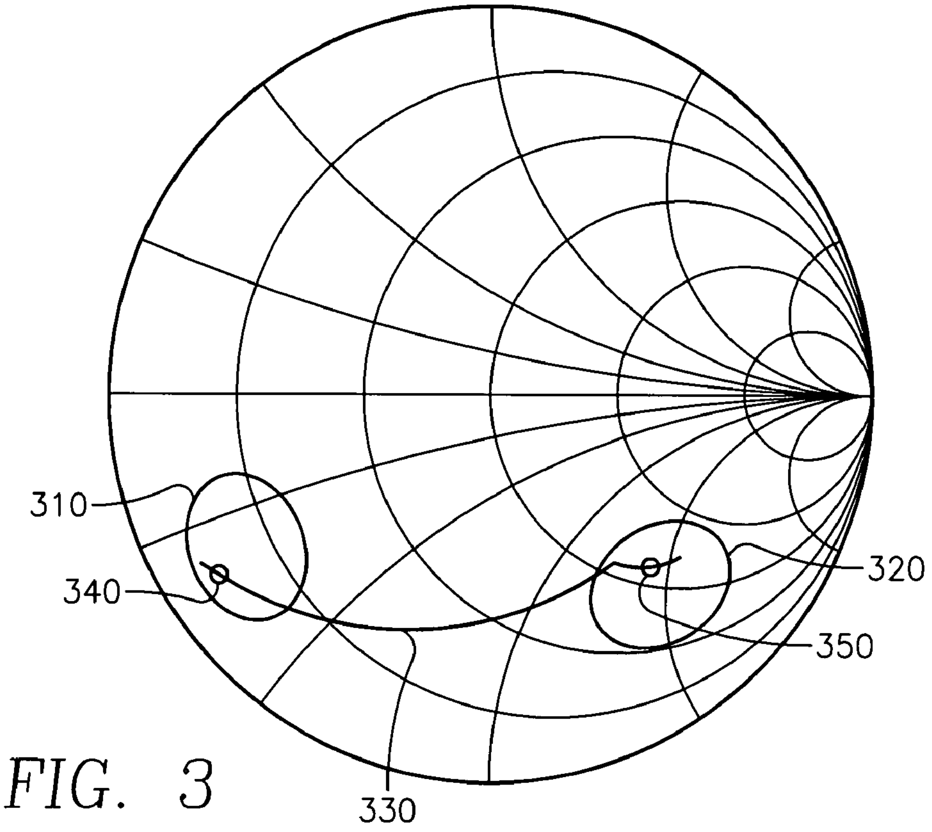
FIG. 3 shows a Smith chart illustrating a frequency response of a multi-frequency dynamic dummy load in accordance with an implementation of the present invention.

Turning to FIG. 3, in one implementation of the present invention, a dual frequency dynamic dummy load is provided that has a frequency response 330 that passes through both tune spaces 310 and 320 of a dual frequency matching network. It is significant to note that the relevant frequency for each tunespace 310 and 320 contains a response 340 and 350 at the same frequency in the dual frequency dynamic dummy load characteristic 330. Thus, the frequency response of the dual frequency dynamic dummy load must pass through the tunespaces at the respective drive frequency of the tunespace.

Providing a multi-frequency dynamic dummy load with a frequency response lying within the multiple tunespaces associated with the multi-frequency matching network allows operation of the multiple frequencies at the same time during testing. This means that the frequency dependent matching networks can generate a characteristic impedance for the given dual frequency dynamic dummy load impedance. As such, the desired center frequency responses of the dual frequency dummy load at 340 and 350 fall within the tunespaces 310 and 320 of the associated multi-frequency matching network.

Figure 2:
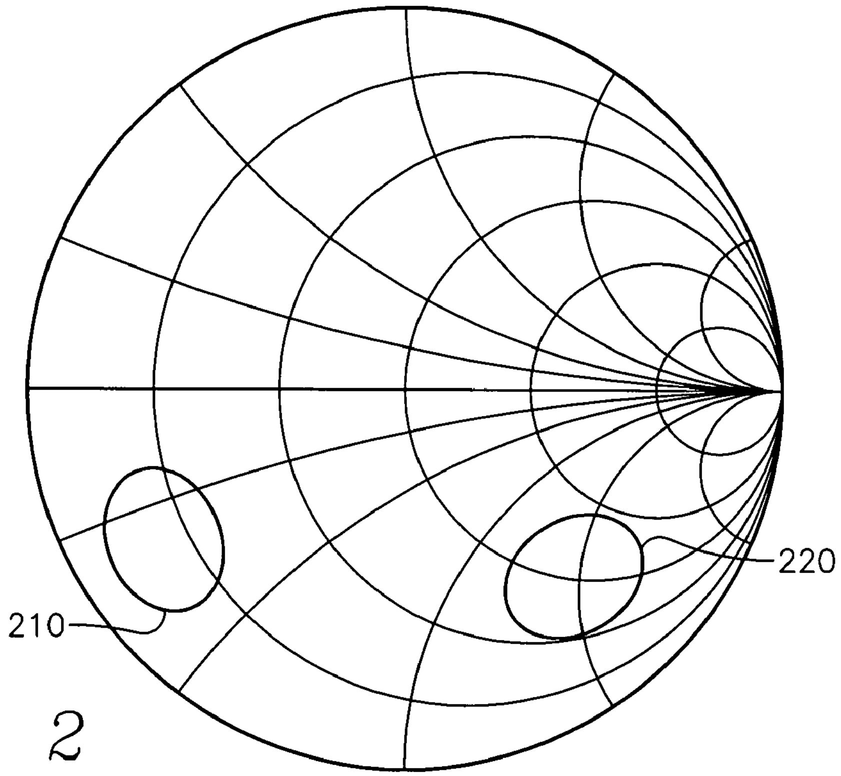
FIG. 2 shows a Smith chart illustrating separate tune spaces for two frequency dependent impedance matching networks.

The multi-frequency dynamic dummy load allows simultaneous characterization of the frequency dependent matching networks 230 and 240 shown in FIG. 2. As such, high voltage and current measurements take into account the impact of the combined frequencies on each of the frequency dependent matching network. Further, the calibration measurements will include the effects of harmonic and intermodulation components caused by operation of the multiple power supplies. As a result, the characterization and reliability of the system is improved.

As discussed further below, in some embodiments, this is accomplished using a network of purely reactive elements terminated to a purely real power termination. The response of this terminated network gives a frequency dependent impedance that crosses into the desired tune space for the multi-frequency matching network being tested at that particular drive frequency. Further, the circuit network may include fixed and/or variable reactances. Moreover, it may include fixed and/or variable dissipative loads. By using variable components, in some multi-frequency dynamic dummy load embodiments it is possible to capture a significant portion of each tunespace rather than only a single point within each tunespace.

Figure 4:
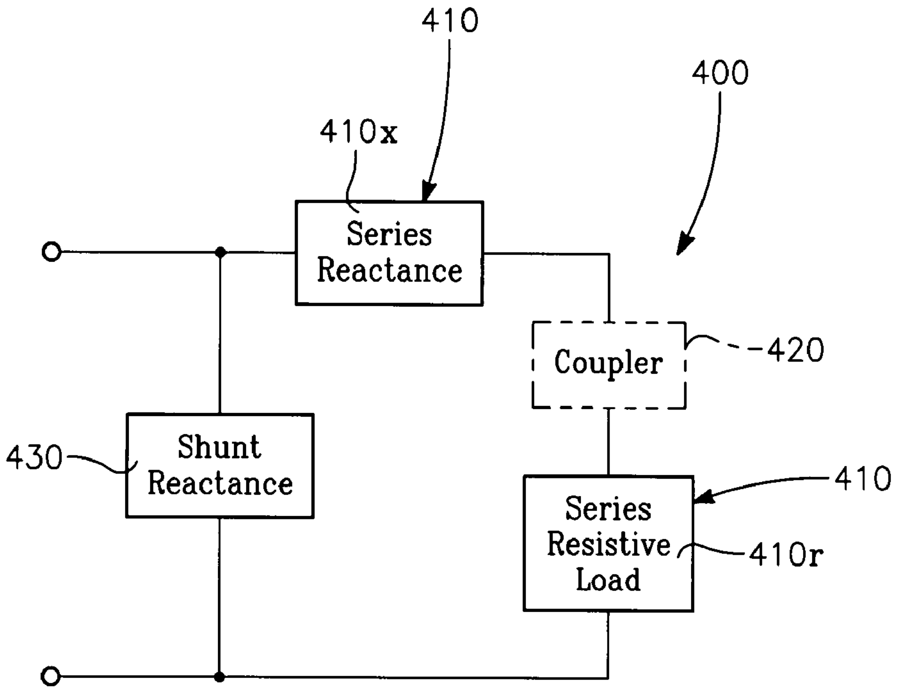
FIG. 4 illustrates a simplified schematic of a multi-frequency dynamic dummy load in accordance with an embodiment of the present invention.

FIG. 4 shows a multi-frequency dynamic dummy load 400 in accordance with one embodiment of the present invention. The multi-frequency dynamic dummy load 400 is provided in place of load 160 shown in FIG. 1. In the embodiment of FIG. 4, the multi-frequency dynamic dummy load 400 includes a series impedance 410 having a series reactance 410*x* in series with a series resistive load 410*r*. A shunt reactance 430 is provide in parallel with the series impedance 410. Typically, the series resistive load 410*r* is a well characterized dissipative load, while the series and shunt reactances 410*x* and 430 are non-dissipative.

An optional coupler 420 may be coupled along the series impedance 410 to allow measurement of the power dissipation by the series impedance 410. In embodiments where the series reactance 410*x* and the shunt reactance 430 are purely imaginary, the coupler 420 may be placed adjacent the series resistance 410*r*.

This particular example embodiment is discussed with reference to a dual frequency dynamic dummy load for illustration purposes. The teachings herein are not limited to two frequencies but are applicable to multi-frequency source power of two or more frequencies. The particular circuit topology will depend on where the tunespaces lie on the Smith Chart. A multi-frequency dynamic dummy load will have a characteristic impedance that falls within each tune space at the operating frequency of the associated frequency dependent network.

In the example discussed above, for a dual frequency embodiment with 13.56 Mhz and 2 Mhz power supplies, a dual frequency dynamic dummy load 300 may include a series resistance 310*r* of 100 ohms, a series reactance 310*r* including a 2 micro henry inductor in series with a 500 picofarad capacitor. The shunt reactance 330 may include a 200 nano henry inductor in series with a 350 picofarad capacitor.

It is significant to note that embodiments of the present invention are not limited to the above example frequencies. Additional example multi-frequency source powers are 13.56 MHz with 60 MHz; 2 MHz with 60 MHz; and 2 Mhz with 13.56 MHz with 60 Mhz, as well as any other frequencies and their combinations. The foregoing frequencies are not intended to be limiting, many other frequencies and combinations are possible.

Figure 5:
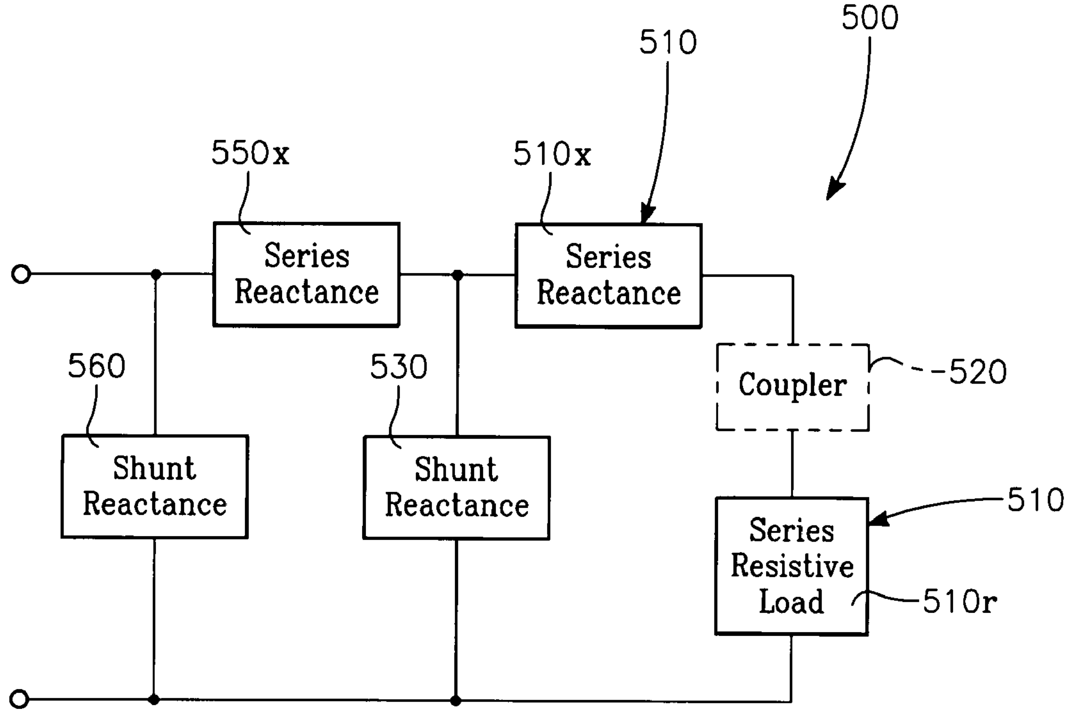
FIG. 5 illustrates a simplified schematic of a multi-frequency dynamic dummy load in accordance with an embodiment of the present invention.

FIG. 5 shows a possible alternate embodiment of a multi-frequency dynamic dummy load 500. This embodiment of the multi-frequency dynamic dummy load 500 includes additional series reactance 510*x* and shunt reactance 560 cascaded with the multi-frequency dynamic dummy load embodiment illustrated in FIG. 4. The embodiment of FIG. 5 includes a series impedance 510 having a series reactance 510*x* in series with a series resistive load 520*r* with a shunt reactance 530 as in FIG. 4. An additional series reactance 550*x* is coupled in series with the series impedance 510 and shunt reactance 530, and additional shunt reactance 560 is coupled in parallel with the series reactance 550*x*. As in the embodiment of FIG. 4, an optional coupler 520 may be included series with the series resistive load 510*r* to allow measurement of the power dissipation by the series resistive load 510*r*.

In one implementation, the embodiment of FIG. 5 may be utilized in testing a multi-frequency system having three source powers, i.e. 2 Mhz/13.56 Mhz/60 Mhz for example. Other implementations are possible.

In another multi-frequency dynamic dummy load embodiment (not shown), additional series reactance and shunt reactance may be cascaded to the embodiment of FIG. 5. The additional series reactance and shunt reactance (not shown) may be coupled in the same fashion that the additional series reactance 550*x* and shunt reactance 560 was cascaded to the embodiment 400 of FIG. 4 to construct the embodiment 500 of FIG. 5. The number of cascaded series and shunt reactances may correspond with the number of different tunespaces of the multi-frequency matching network.

Figure 6:
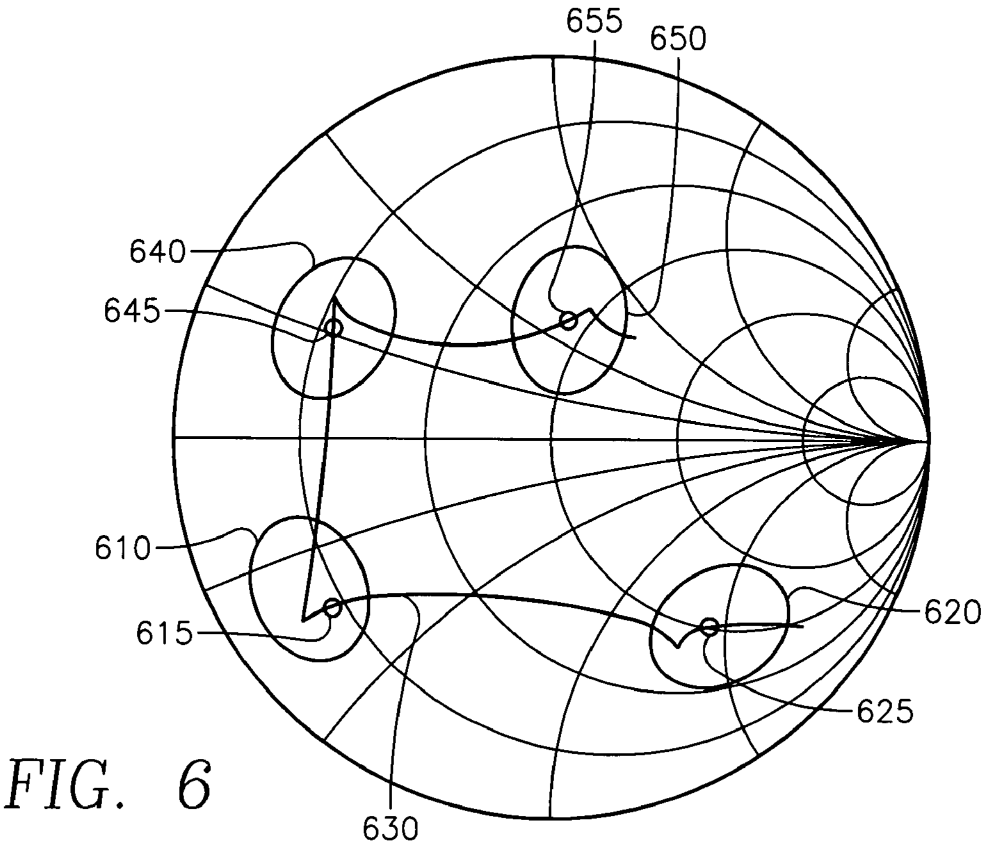
FIG. 6 shows a Smith chart illustrating a frequency response of a multi-frequency dynamic dummy load in accordance with an implementation of the present invention.

FIG. 6 shows one example of a possible frequency response 630 passing through multiple tunespaces 610, 620, 640, and 650 corresponding to four frequency dependent matching networks. A circuit having the frequency response 630 is determined by selecting a point 615, 625, 645, and 655 within each tunespace and solving for the impedance values to produce a frequency response 630 that passes through each tunespace at the operating frequency of each frequency dependent matching network. Thus, the frequency response 630 for the multi-frequency dummy load at each source power operating frequency falls within tunespace of the frequency dependent matching network for that operating frequency.

Although in the example of FIG. 6, the frequency response 630 is not shown capturing the entirety of each tunespace 610, 620, 640, or 650, it is possible in some embodiments to provide variable components to capture more, or all of each tunespace 610, 620, 640, or 650. In some implementations, characterizing the performance of the multi-frequency matching network includes varying the frequency of the associated RF source power, for example +/−5%, within its frequency range, to give tunespace breadth in the reactive direction. In some implementations, the shunt capacitance is varied to gives breadth in the real direction. In some implementations, variable series and shunt components are adjusted to capture the tunespace.

It is significant to note that although the embodiment of FIG. 4 is depicted with an L-type circuit configuration, other configurations are possible. Some example configurations include a reversed L-type, a pi-type, a T-type, or their combinations. In a reversed L-type embodiment (not shown), rather than having a series element 410*x* adjacent the resistive load 410*r*, with the shunt element 430 in parallel with the series element 410*x*, the reversed L-type circuit instead has the shunt element 430 coupled between the series element 410*x* and the resistive load 410*r*.

Referring to the interconnections of FIG. 5 for illustration purposes, such a reversed L-type embodiment may be configured with only the shunt reactance 530 and the series reactance 550*x*(along with the resistive load 510*r*) as arranged in FIG. 5. A basic pi-type embodiment may be configured with only the shunt reactance 530, the shunt reactance 560, and the series reactance 550*x*(along with the resistive load 510*r*) as arranged in FIG. 5. A basic T-type embodiment may be configured with only the series reactance 510*x*, the shunt reactance 530, and the series reactance 550*x*(along with the resistive load 510*r*) as arranged in FIG. 5. Combinations including cascading of the different circuit types is possible. The various combinations and/or cascading of circuit types may be used in multi-frequency implementations of two or more frequencies, to more effectively capture tune spaces or increase the coverage within one or more tune spaces, by allowing greater variability.

In an alternate embodiment (not shown), the multi-frequency dynamic dummy load may be constructed with parallel circuits each having complementary frequency isolation and resistors. For example in a dual frequency dynamic dummy load embodiment, there are two parallel paths to ground such that one of the parallel paths has some impedance at a first frequency but is a substantially open circuit at a second frequency, while another of the parallel paths has some test impedance at a second frequency but is a substantially open circuit at the first frequency. This embodiment may have multiple parallel paths corresponding to the multiple frequency power sources. For example, the multi-frequency dynamic dummy load may include multiple parallel paths each comprising a resistor in series with a reactance, for example a capacitor, coupled to ground.

As such, a single multi-frequency dynamic dummy load may simultaneously provide a load impedance within the tunespace of multiple matching networks having multiple power sources operating at different frequencies.

While the invention herein disclosed has been described by the specific embodiments and implementations, numerous modifications and variations could be made thereto by those skilled in the art without departing from the scope of the invention set forth in the claims.

What is claimed is:

1. A plasma reactor multi-frequency dynamic dummy load adapted for a multi-frequency matching network comprised of multiple matching networks, each of the multiple matching networks being tunable within an identified tunespace, the plasma reactor dynamic dummy load being capable of simultaneously providing a frequency response within the identified tunespace of each of the multiple matching networks at an operating frequency of an associated RE power source, the dynamic dummy load comprising:

a) a series reactance in series with a load resistor;

b) a shunt reactance in parallel with the series reactance and the load resistor; and c) wherein the series reactance, the shunt reactance and the load resistance comprise values selected to simultaneously provide the frequency response within the identified tunespace of each of the multiple matching networks at the operating frequency of the associated RE power source.

2. The multi-frequency dynamic dummy load of claim 1 wherein the multi-frequency dynamic dummy load is constructed to be coupled between parallel coupled matching networks.

3. The multi-frequency dynamic dummy load of claim 2 wherein the multi-frequency dynamic dummy load is constructed to be coupled between a first matching network coupled in parallel with a second matching network, wherein the first matching network is capable of providing impedance matching for a first RE power source, and wherein the second matching network is capable of providing impedance matching at a second RE power source.

4. The multi-frequency dynamic dummy load of claim 2 wherein the multi-frequency dynamic dummy load comprises on of: (a) fixed real and reactive components; (b) variable real and reactive components; or (c) a fixed real component and variable reactive components.

5. The multi-frequency dynamic dummy load of claim 2, wherein the series reactance and the shunt reactance are essentially purely imaginary and further comprising a coupler in series with the load resistor so as to allow measurement of a power dissipation by the load resistor.

6. The multi-frequency dynamic dummy load of claim 2 wherein the series reactance comprises an inductor in series with a capacitor; and wherein the shunt impedance comprises a capacitor in series with an inductor.

7. The multi-frequency dynamic dummy load of claim 6 further comprising a coupler in series with the series impedance.

8. The multi-frequency dynamic dummy load of claim 2 wherein the multi-frequency dynamic dummy load comprises a dynamic dummy load capable of providing a frequency response for multiple points within each tunespace of the multiple matching networks for the operating frequency of the associated RE power source.

9. A plasma reactor dual frequency dynamic dummy load adapted for a dual frequency matching network comprised of two frequency dependent matching networks, each of the frequency dependent matching networks being tunable within an identified tunespace, the plasma reactor dual frequency dynamic dummy load being capable of simultaneously providing a frequency response within the tunespace of each of the frequency dependent matching networks at an operating frequency of an associated RE power source, the dynamic dummy load comprising:

a) a series reactance in series with a series load resistor;

b) a shunt reactance in parallel with the series reactance and the series load resistor; and c) wherein the series reactance, the shunt reactance and the load resistance comprise values selected to simultaneously provide the frequency response within the identified tunespace of each of the multiple matching networks at the operating frequency of the associated RE power source.

10. The dual frequency dynamic dummy load of claim 9 wherein the dual frequency dynamic dummy load is adapted to be coupled at a common output of the dual frequency matching network in place of a plasma chamber.

11. The dual frequency dynamic dummy load of claim 10 wherein the dual frequency dynamic dummy load is adapted to be coupled between a first matching network coupled in parallel with a second matching network, wherein the first matching network is capable of providing impedance matching at a first RF power source, and wherein the second matching network is capable of providing impedance matching at a second RE power source.

12. The dual frequency dynamic dummy load of claim 10 wherein the dual frequency dynamic dummy load comprises one of: (a) fixed real and reactive components; (b) variable real and reactive components; or (c) a fixed real component and variable reactive components.

13. The dual frequency dynamic dummy load of claim 9, wherein the series reactance and the shunt reactance are essentially purely imaginary and further comprising a dual directional coupler in series with the load resistor so as to allow measurement of a power dissipation by the load resistor.

14. The dual frequency dynamic dummy load of claim 9 wherein the series reactance comprises a series inductor in series with a series capacitor; and wherein the shunt reactance comprises a shunt capacitor in series with a shunt inductor.

15. The dual frequency dynamic dummy load of claim 14 being capable of providing a frequency response within a first tunespace at about 13.56 Mhz and within a second tunespace at about 2 Mhz, and wherein the series load resistor comprises about 100 ohms, the series inductor comprises about 2 micro henries, and the series capacitor comprises about 500 pico farads, and wherein the shunt capacitor comprises about 350 pico farads and the shunt inductor comprises about 200 nano henries.

16. The dual frequency dynamic dummy load of claim 14 further comprising a dual directional coupler in series with the series impedance for determining power loss in the series resistor.

17. The dual frequency dynamic dummy load of claim 10 wherein the dual frequency dynamic dummy load comprises a dynamic dummy load capable of providing a frequency response for multiple points within each tunespace of the frequency dependent networks for the operating frequency of the associated RE power source.

18. A plasma reactor dual frequency dynamic dummy load adapted for a dual frequency matching network comprised of a matching network coupled to a 13.5 Mhz source power supply and a matching network coupled to a 2 Mhz source power supply, the dual frequency dynamic dummy load comprising:

a) a shunt impedance in parallel with a series impedance;

b) the series impedance comprising about 100 ohms resistance in series with about 2 micro henries of inductance in series with about 500 pico farads of capacitance; and c) the shunt impedance comprising about 350 pico farads of capacitance in series with about 200 nano henries of inductance.

19. The plasma reactor dual frequency dynamic dummy load further comprising a dual directional coupler in series with the series impedance for determining power loss in the series resistor.

20. The multi-frequency dynamic dummy load of claim 1, wherein the dynamic dummy load is adapted for a multi-frequency matching network comprising at least three matching network corresponding to at least three different operating frequencies, the multi-frequency dynamic dummy load further comprising a cascaded circuit for each additional operating frequency coupled to the series reactance, the cascaded circuit comprising:

a) a cascaded series circuit comprising a series reactance in series with the load resistor; and b) a cascaded shunt reactance in parallel with the cascaded series reactance and the load resistor.

* * * * *